(12) United States Patent
Yoon et al.

(10) Patent No.: US 7,701,910 B2
(45) Date of Patent: Apr. 20, 2010

(54) REVERSE LINK LOAD ESTIMATION USING REFERENCE SIGNAL

(75) Inventors: Young C. Yoon, San Diego, CA (US); Reza Shahidi, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 574 days.

(21) Appl. No.: 11/287,804

(22) Filed: Nov. 28, 2005

(65) Prior Publication Data

US 2007/0121553 A1 May 31, 2007

(51) Int. Cl.
*H04B 7/216* (2006.01)

(52) U.S. Cl. .................. 370/335; 370/318; 370/322; 370/328; 370/341; 370/348; 455/522; 455/450; 455/451; 455/452.1; 455/452.2; 455/453

(58) Field of Classification Search ............... 370/322, 370/328, 335, 318, 341, 348; 455/450, 451, 455/452.1, 452.2, 453, 522
See application file for complete search history.

(56) References Cited

U.S. PATENT DOCUMENTS

| | | | | |
|---|---|---|---|---|
| 5,425,076 A * | 6/1995 | Knippelmier | ............ | 379/27.04 |
| 5,564,074 A * | 10/1996 | Juntti | ............ | 455/67.11 |
| 5,910,977 A * | 6/1999 | Torregrossa | ............ | 379/27.01 |
| 5,946,346 A * | 8/1999 | Ahmed et al. | ............ | 375/219 |
| 6,272,337 B1 * | 8/2001 | Mount et al. | ............ | 455/423 |
| 6,285,876 B1 * | 9/2001 | Zhong | ............ | 455/424 |
| 6,442,398 B1 * | 8/2002 | Padovani et al. | ............ | 455/522 |
| 6,662,009 B2 * | 12/2003 | Lynn | ............ | 455/424 |
| 6,775,555 B2 * | 8/2004 | Suwa | ............ | 455/522 |
| 6,819,936 B2 * | 11/2004 | Weissman | ............ | 455/522 |
| 6,973,326 B2 * | 12/2005 | Noh | ............ | 455/522 |
| 7,058,031 B2 * | 6/2006 | Bender et al. | ............ | 370/329 |
| 7,085,531 B2 * | 8/2006 | Ozluturk | ............ | 455/39 |
| 7,299,402 B2 * | 11/2007 | Soong et al. | ............ | 714/807 |
| 2001/0036831 A1 * | 11/2001 | Rezaiifar et al. | ............ | 455/455 |
| 2004/0142692 A1 * | 7/2004 | Schwarz et al. | ............ | 455/442 |
| 2005/0026624 A1 * | 2/2005 | Gandhi et al. | ............ | 455/453 |
| 2006/0056354 A1 * | 3/2006 | Vasudevan et al. | ............ | 370/332 |
| 2006/0068849 A1 * | 3/2006 | Bernhard et al. | ............ | 455/562.1 |

* cited by examiner

*Primary Examiner*—Stephen M D'Agosta
(74) *Attorney, Agent, or Firm*—Coats & Bennett, P.L.L.C.

(57) ABSTRACT

A reference signal including a quality indication is injected into the reverse link signal received at a base station. The transmit power of the reference signal is controlled by the base station through reverse link power control, and the base station estimates the reverse link load from the transmit power of the reference signal. As the load increases, the transmit power must increase to overcome interference. The reference signal may be generated by a signal generator within the base station; by a mobile station hardwired to the base station; or by a mobile station proximate the base station, sending the reference signal over the air interface. The reverse link load may be estimated directly from reference signal transmit power, or from the reference signal transmit power minus a minimum reference signal transmit power in the absence of interference.

19 Claims, 3 Drawing Sheets

US 7,701,910 B2

REVERSE LINK LOAD ESTIMATION USING REFERENCE SIGNAL

BACKGROUND

The present invention relates generally to the field of wireless communications and in particular to a method of reverse link load estimation using a reference signal.

Modern cellular wireless communication networks provide voice and data communication services to mobile stations throughout a geographic area, such as a cell or sector. Voice and data are transmitted on dedicated channels and on shared packet data channels from base stations to mobile stations within their coverage area. This is known as the forward link. Voice and data are also transmitted from mobile stations to one or more base stations, known as the reverse link.

For efficient and stable operation, it is imperative that the base station maintain an accurate estimate of the reverse link load. As used herein, the "load" is a measure of how congested, or how close to full capacity, a network, cell, or sector is at any given time. More specifically, the load is defined as the ratio of total received power at the base station to the thermal noise power. The total received signal power includes all received signals from mobile stations reaching the base station and the thermal noise. When this ratio is small, the load is defined as being low. Conversely, when the ratio is high, the load is defined as high. The reverse link load ratio is also known in the art as the rise-over-thermal (ROT).

Accurate estimation of the reverse link load is important for several reasons. First, it is used to help maintain system stability. For example, if the reverse link load becomes high, congestion control may be initiated to reduce the load. Second, knowledge of the reverse link load may help the wireless network run more efficiently at a finer time scale level (e.g., 800 Hz). For example, a sector with a low reverse link load over several 1.25 millisecond periods may allow traffic channels such as the reverse packet data channel (R-PDCH) to broadcast at higher rates, thus increasing the load. Third, the level of an "uncertainty buffer"—the back-off from a threshold indicating a highly loaded condition—may be reduced. The uncertainty buffer level must be increased as the load estimation accuracy decreases. Fourth, accurate reverse link load estimation may assist admission control and load balancing. These benefits are similar to improved system stability and efficiency, but at a larger time scale. For example, if the reverse link load of one carrier is high, with a highly accurate estimation, an incoming call request from a user may be diverted to an alternate carrier.

Current methods of estimating the reverse link load suffer from unacceptable inaccuracies. In one prior art technique, received signal power is directly measured, such as at the output of an automated gain control (AGC) circuit in the base station. This gives an inaccurate estimate of the reverse link load, particularly with respect to temperature changes. In another prior art approach, the absolute sector received power estimate (RSSI over all mobile stations) is calculated. However, each mobile station's received signal strength is a poor indicator of the reverse link load. Still another prior art approach utilizes the received signal to interference noise ratio (SINR) information of demodulated signals. This provides an inaccurate measure of reverse link load since the SINR information of non-demodulated signals is necessarily taken into account. Another approach that yields an inaccurate estimate of the reverse link load is the target load sum: sum_k [SINR_k/(1+SINR_k)] using set points. Still another inaccurate prior art reverse link load estimate is the energy sum—using received SINR_k (or Eb/Nt).

Reverse link power control is well known in CDMA systems. The base station sends power control information to each mobile terminal in a cell or sector at the rate of 800 Hz in CDMA 2000, and 1500 Hz in WCDMA. If the base station can clearly decode the information from a mobile terminal, it directs the mobile terminal to reduce its transmit power on the reverse link. If the base station detects errors in the signal received from the mobile terminal, it directs the mobile terminal to increase its transmit power. The base station uses a quality indication from the mobile terminal to determine whether there are errors in the received signal, and therefore to determine how to control the reverse link power level for the mobile terminal.

Reverse link power control is related to the reverse link load. As the reverse link load increases, more interference exists on the reverse link, degrading the quality of signals received by the base station from each mobile terminal in the cell or sector. Consequently, the base station must direct each mobile terminal to increase its transmit power in order to be able to decode the reverse link signals.

SUMMARY

A reference signal including an indication of signal quality is injected into the reverse link signal received at a base station. For example, the reference signal may be a voice call on the R-FCH, including a CRC value. The transmit power of the reference signal is controlled and ascertained by the base station, and is indicative of the reverse link load. At low loads, the reference signal transmit power will be low. As the reverse link load increases, the reference signal transmit power must increase to overcome interference.

The reference signal may be generated by a signal generator within the base station; by a mobile station hardwired to the base station; or by a mobile station proximate the base station, sending the reference signal over the air interface. In the cases of a mobile station providing the reference signal, the base station may ascertain the transmit power of the reference signal by periodic transmit power level reports from the mobile station, and by interpolation between such reports by sending power control commands. Alternatively, the reference signal may comprise the R-REQCH, carrying the mobile station power headroom information. The base station may control the transmit power of the signal generator directly.

The reverse link load may be calculated directly from the reference signal transmit power. Alternatively, a minimum reference signal transmit power may be established, which is the reference signal transmit power in the absence of interference. The reverse link load may then be estimated as the ascertained reference signal transmit power minus the minimum reference signal transmit power. The minimum reference signal transmit power may be calibrated using a predetermined test function with a set noise floor, and/or may tracked and estimated during operation.

In one embodiment, the present invention relates to a method of estimating the reverse link load at a base station in a wireless communication network. A reference signal having a quality indication is injected into the reverse link signal received at the base station. The transmit power of the reference signal is ascertained, and the reverse link load is estimated based on the transmit power of the reference signal.

In another embodiment, the present invention relates to a base station of a wireless communication network. The base station includes a receiver operative to receive reverse link wireless communications signals from mobile stations. The receiver is further operative to receive a reference signal having a quality indication. The base station also includes a processor operative to control the receiver and to ascertain the transmit power of the reference signal. The base station further includes a reverse link load estimator operative to estimate the reverse link load based on the transmit power of the reference signal.

DETAILED DESCRIPTION

Figure 1:
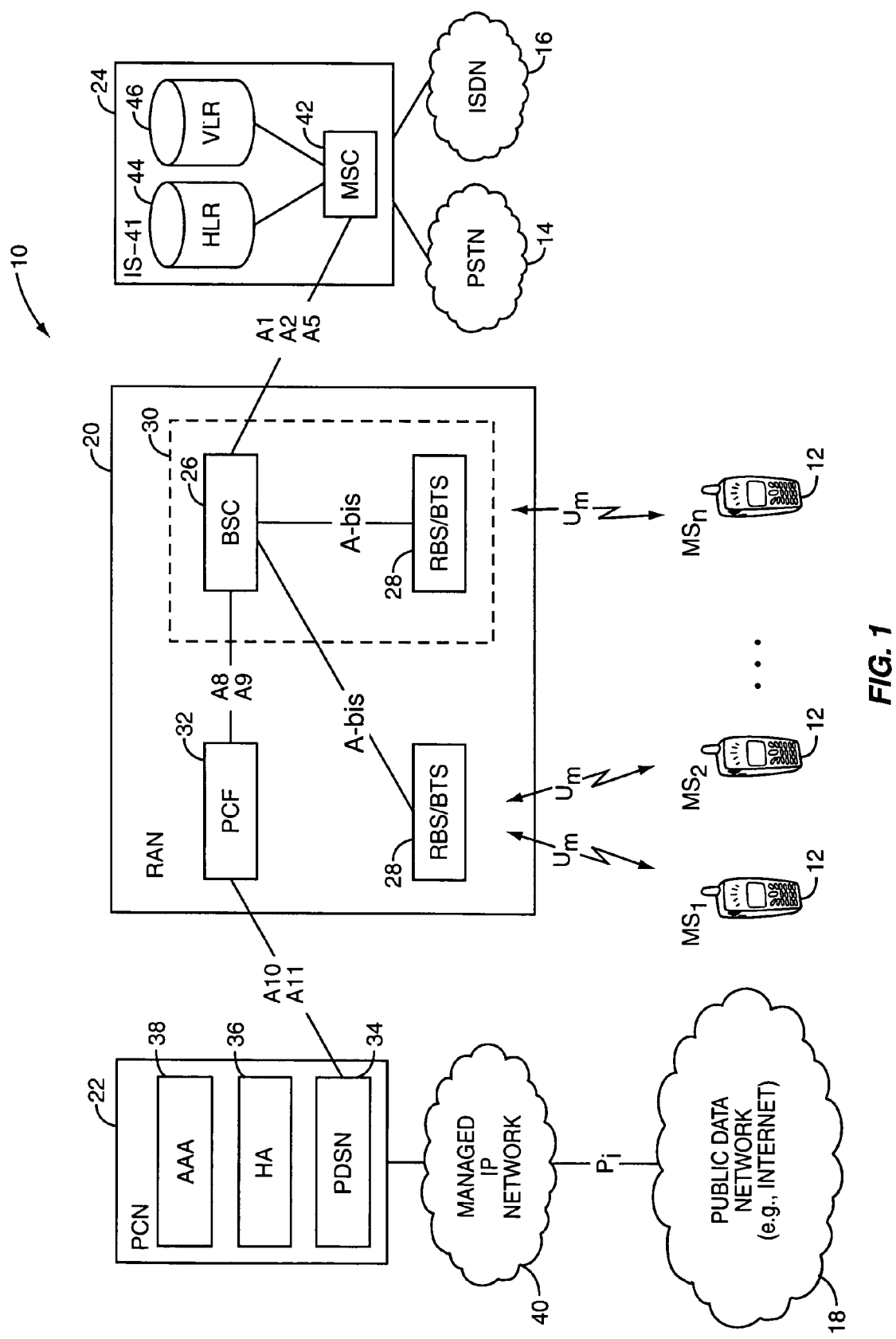
FIG. 1 is a functional block diagram of a wireless communication network.

FIG. 1 illustrates an exemplary wireless communication network generally referred to by the numeral 10. The wireless communication network 10 may be any type of wireless communication network, such as a CDMA network, WCDMA network, GSM/GPRS network, EDGE network, or UMTS network. In one exemplary embodiment, network 10 is based on cdma2000-1× standards as promulgated by the Telecommunications Industry Association (TIA), although the present invention is not limited to such implementations. Here, network 10 communicatively couples one or more mobile stations 12 to another mobile station 12, or to the Public Switched Telephone Network (PSTN) 14, the Integrated Data Services Network (ISDN) 16, and/or a Public Data Network (PDN) 18, such as the Internet. In support of this functionality, the network 10 comprises a Radio Access Network (RAN) 20 connected to a Packet Core Network (PCN) 22 and an IS-41 network 24.

The RAN 20 typically comprises one or more Base Station Controllers (BSCs) 26, each connected to one or more Radio Base Stations (RBS) 28 via an A-bis interface. Each RBS 28 (also known in the art as a Base Transceiver Station, or BTS) includes the transceiver resources (see FIG. 2) supporting radio communication with mobile stations 12, such as modulators/demodulators, baseband processors, radio frequency (RF) power amplifiers, antennas, etc. The combination of a BSC 26 and a RBS/BTS 28 form a Base Station (BS) 30. Note that a given BSC 26 may be part of more than one BS 30. In operation, a BS 32 transmits control and traffic data to mobile stations 12 on forward link channels, and receives control and traffic data from the mobile stations 12 on reverse link channels.

The BSC 26 is communicatively coupled to the PCN 22 via a Packet Control Facility (PCF) 32. The BSC 26 connects to the PCF 32 over an A8 interface carrying user traffic and an A9 interface carrying signaling. The PCF 32 manages the buffering and relay of data packets between the BS 30 and the PCN 22. As those of skill in the art will recognize, the PCF 32 may be part of the BSC 26, or may comprise a separate network entity.

The PCN 22 comprises a Packet Data Serving Node (PDSN) 34, a Home Agent (HA) 36, and an Authentication, Authorization, and Accounting (AAA) server 38. The PCN 22 may couple to the PDN 18 through a managed IP network 40, which operates under the control of the network 10. The IP network 40 connects to the PDN 18 via a $P_i$ interface, or alternatively another industry standard packet data communication protocol, such as Transport Control Program/Internet Protocol (TCP/IP). Alternatively, the PCN 22 may couple directly to the PDN 18, such as the Internet.

The PDSN 34 provides packet routing services, maintaining routing tables and performing route discovery. The PSDN 34 additionally manages the Radio-Packet (R-P) interface and Point-to-Point Protocol (PPP) sessions for mobile users, assigning authenticated mobile stations 12 an IP address from a pool of addresses. The PSDN 34 additionally frames data such as Broadcast/Multicast Services (BCMCS) media streams for transmission across the RAN to the BS 30 for transmission to one or more mobile stations 12. The PSDN 34 also provides Foreign Agent (FA) functionality for registration and service of network visitors, and initiates authentication procedures with the AAA server 38. The PSDN is communicatively coupled to the PCF 32 via an A10 interface for user traffic and an A11 interface for signaling. HA 36 operates in conjunction with PDSN 34 to authenticate Mobile IP registrations and to maintain current location information in support of packet tunneling and other traffic redirection activities. The AAA server 38 provides authentication, authorization and accounting services for the PSDN 34.

The BSC 26 may also communicatively couple the RAN 20 to an IS-41 network 24. The IS-41 network 24 includes a Mobile Switching Center (MSC) 42 accessing a Home Location Register (HLR) 44 and Visitor Location Register (VLR) 46 for subscriber location and profile information. The MSC 42, coupled to the BSC 26 via an A1 interface for signaling and A2/A5 interface for user traffic, switches circuit-mode traffic between mobile stations 12 and the PSTN 16 and ISDN 14, and provides processing and control for calls and services.

Figure 2:
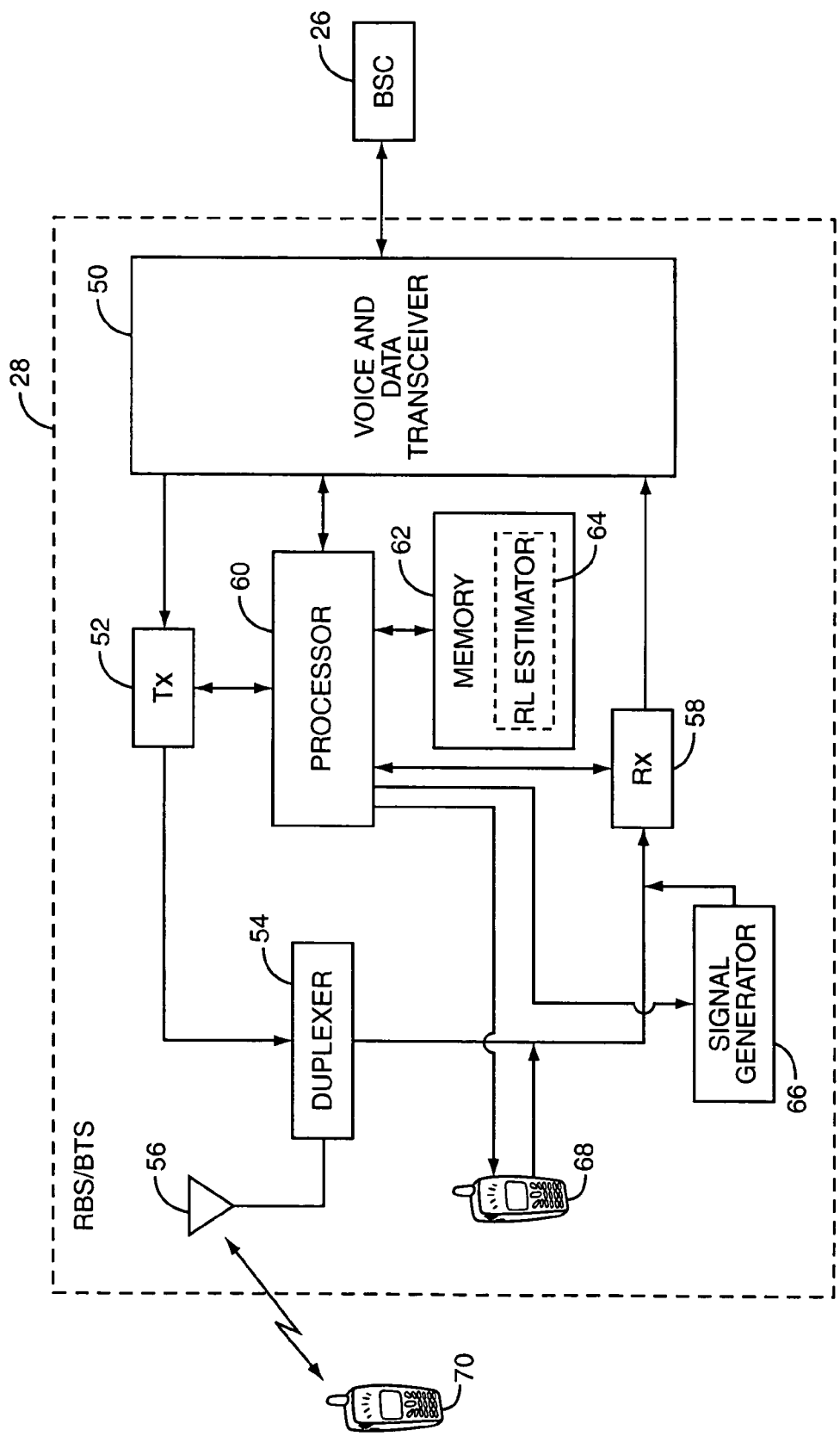
FIG. 2 is a functional block diagram of a Radio Base Station/Base Transceiver Station.

FIG. 2 depicts a functional block diagram of a RBS/BTS 28. As discussed above, the RBS/BTS 28, in combination with a BSC 26, forms a base station 30 that provides communication services to mobile stations 12 within a cell or sector over an air interface. The RBS/BTS 20 includes voice and data transceivers 50, transmit (Tx) circuits 52, a duplexer 54, antenna 56, receive (Rx) circuits 58, and one or more processors 60.

The transceivers 50 exchange voice, data, and control information with the BSC 26. Voice and data on the forward link are modulated and amplified by Tx circuits 52, and transmitted through the duplexer 54 onto the antenna 56. The antenna 56 additionally receives reverse link signals from mobile stations 12. These reverse link signals pass through the duplexer 54 and to Rx circuits 58, where they are demodulated and decoded, and passed through the transceivers 50 to the BSC 26. The overall operation of the RBS/BTS 28 is controlled by one or more processors 60, which may comprise microprocessors, digital signal processors, or the like. Memory 62 is operatively connected to the processor 60, and may include software modules, such as an inventive reverse link load estimator 64, that estimates the reverse link load by performing reverse link power control on a reference signal.

To estimate the reverse link load, a reference signal including quality information, the transmit power of which is set by reverse link power control, is injected into the received reverse link signal. The reference signal may comprise, for example, an existing voice channel such as the Reverse Fundamental Channel (R-FCH). This channel includes a Cyclic Redundancy Check (CRC) as a frame quality indicator. As another example, the reference signal may comprise a Dedicated Control Channel (R-DCCH) or a Request Channel (R-REQCH) which may include the mobile station power headroom information. A variety of other signals may be utilized as a reference signal, subject only to the conditions that the reference signal include some quality indicator, and that the base station is able to control and ascertain the transmit power of the reference signal by performing reverse link power control on it.

The reference signal may be injected into the received reverse link signal in at least three ways: by a signal generator 66; a mobile station 68 hardwired to the RBS/BTS 28; and a mobile station 70 in close proximity to the RBS/BTS 28, and communicating therewith over the air interface.

In one embodiment, a signal generator 66, under the control of the processor 60, generates the reference signal and injects it into the received reverse link signal, as indicated in FIG. 2. The signal generator 66 may comprise a chip or card in the RBS/BTS 28 electronics. In this case, the processor 60 may directly control, and hence may readily ascertain, the transmit power of the reference signal. Alternatively, the signal generator 66 may be configured and programmed to respond to reverse link power control commands generated by the processor 60, hence emulating a mobile terminal on the reverse link.

In another embodiment, the reference signal may be injected into the received reverse link signal by a mobile terminal 68 that is hardwired to the RBS/BTS 28. That is, the reference signal is generated and transmitted by the mobile terminal 68; however, the reference signal does not travel over the air interface. Rather, the reference signal is injected directly into the receiver electronics 58. In this case, the processor 60 control the transmit power level of the reference signal by reverse link power control.

In another embodiment, the reference signal is generated by a mobile station 70, preferably in close proximity to the RBS/BTS 28, and is transmitted across the air interface to the antenna 56. In this case, the received reference signal is inherently a part of the received reverse link signal, and is routed to the receiver electronics 58 by the duplexer 54. In this case, a mechanism is required such that the RBS/BTS 28 may ascertain the transmit power level of the reference signal.

In one embodiment, the mobile station 70 may periodically provide the RBS/BTS 28 with updates of its transmit power. The RBS/BTS 28 may interpolate during the time between such transmit power level updates using power control commands sent to the mobile station 70. The RBS/BTS 28 would, in this case, require that it be the only RBS/BTS 28 in the active set of the mobile station 70. This is necessary to avoid more than one RBS/BTS 28 power-controlling the mobile station 70. The frequency of transmit power updates and the need for interpolation will depend on the required frequently of reverse link load estimate updates.

Regardless of how the reference signal is generated and injected into the received reverse link signal at the RBS/BTS 28, the RBS/BTS 28 may ascertain the transmit power level of the reference signal and use this power level to estimate the reverse link load. When a cell or sector is lightly loaded, the transmit power level of the reference signal will be low. When the cell or sector is highly loaded, the transmit power level of the reference signal will be much higher, to compete with the larger level of interference. The power level of the reference signal must then be mapped to the reverse link load.

This mapping of the transmit power level of the reference signal to the reverse link load estimate may be done with or without calibration. In one embodiment, the reverse link load may be estimated directly from the transmit power of the reference signal (that is, the reference signal transmit power is not calibrated). In practice, however, the noise floor may vary with temperature, and at each RBS/BTS 28 due to factors such as aging or design differences.

Accordingly, a calibration procedure may be employed, wherein a minimum reference signal transmit power level may be established. This minimum transmit power level reflects the required power level for transmission of the reference signal in the absence of any interference—that is, only background thermal noise. This value may be established in several ways. In one embodiment, the signal is calibrated with a predetermined test function using a set noise floor. Alternatively (or additionally), a long-term minimum reference signal transmit power level value may be tracked and estimated over the course of operation. This long-term tuning of a minimum reference signal transmit power value may be more accurate, given variations in the field and among different RBS/BTS 28.

Once the minimum reference signal transmit power value is determined, the reverse link load estimate may be calculated as the reference signal transmit power level minus the minimum reference signal transmit power level. This provides a reverse link load estimate that reflects only actual interference (e.g., load) and not background thermal noise.

Figure 3:
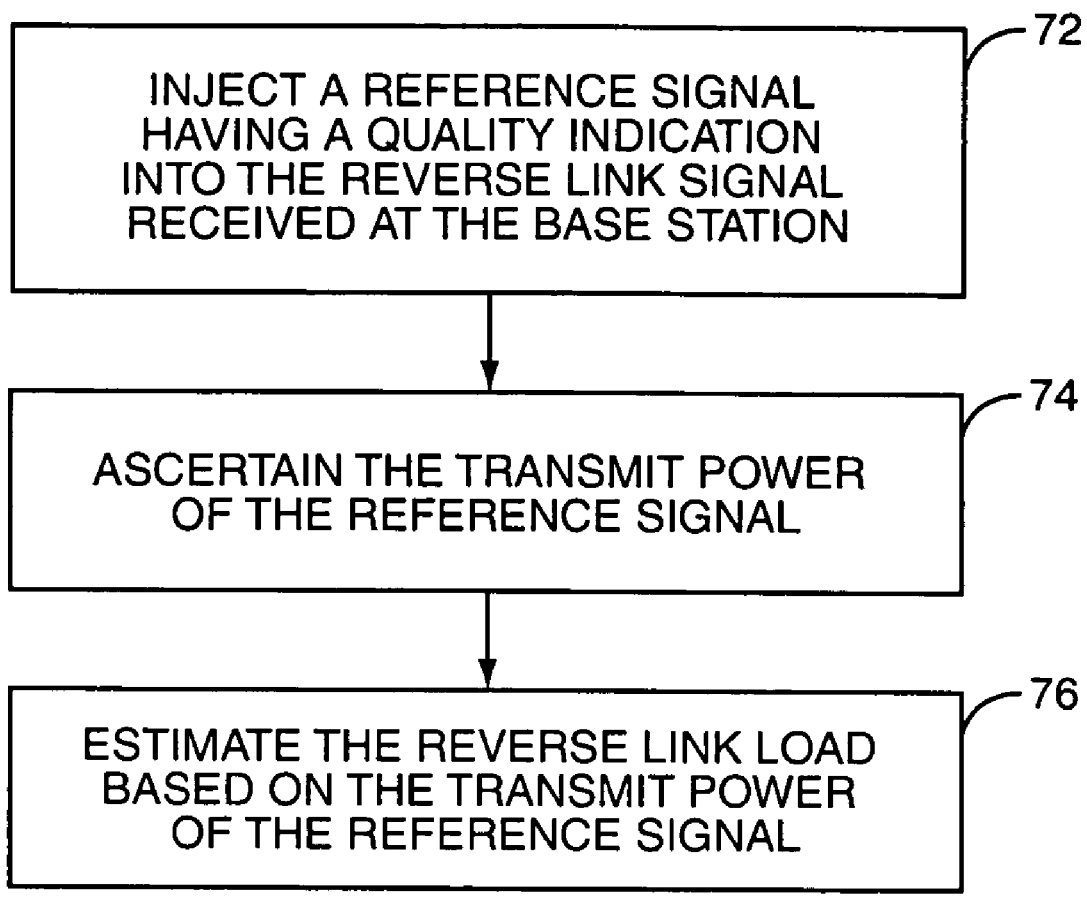
FIG. 3 is a flow diagram of a method of reverse link load estimation.

FIG. 3 depicts, in flow diagram form, a method of estimating the reverse link load at a base station. A reference signal having a quality indication is injected into the reverse link signal at the base station (block 72). This may comprise a signal generator within the base station, a mobile station hardwired to the base station, or a mobile station transmitting the reference signal to the base station over the air interface.

The base station then ascertains the reference signal transmit power level (block 74). In all three cases, the RBS/BTS 28 may control the transmit power by reverse link power control, and in the case of a signal generator 66 or hardwired mobile terminal 68, may control the transmit power directly. Alternatively, the transmit power information may be extracted from the mobile station power headroom information if the reference signal is the R-REQCH.

Once the base station has ascertained the reference signal transmit power level, it estimates the reverse link load based on the reference signal transmit power level (block 76). In a non-calibrated embodiment, the reverse link load is equated to the reference signal transmit power level. In calibrated embodiments, a minimum reference signal transmit power level is established, which is the reference signal transmit power level in the absence of interference. In one embodiment, the minimum reference signal transmit power level is established by calibrating the reference signal with a predetermined test function having a set noise floor. In another embodiment, the minimum reference signal transmit power level is tracked and estimated on an ongoing basis during operation. In either embodiment, the reverse link load is estimated as the reference signal transmit power level minus the minimum reference signal transmit power level.

The present invention provides a simple and flexible, but accurate, estimation of the reverse link load. This accurate reverse link load estimate may be advantageously utilized in several aspects of wireless network operation, as discussed above.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of estimating the reverse link load at a base station in a wireless communication network, comprising:
   injecting a reference signal having a quality indication into the reverse link signal received at the base station, wherein said reference signal is wirelessly transmitted to the base station by a test mobile station;
   ascertaining the transmit power of the reference signal by receiving periodic transmit power reports from the mobile station, and directing the mobile station to remove other base stations from an active set to prevent power control of the mobile station by another base station;
   determining a minimum reference signal transmit power as the transmit power of the reference signal in the substantial absence of interference by calibrating the reference signal with a predetermined test function having a set noise floor; and
   estimating the reverse link load based on a difference between the transmit power of the reference signal and the minimum reference signal transmit power.

2. The method of claim 1 wherein the reference signal comprises a voice call over the R-FCH.

3. The method of claim 2 wherein the voice call is transmitted at the lowest frame rate.

4. The method of claim 1 wherein the reference signal comprises R-REQCH signal that includes mobile station power headroom information.

5. The method of claim 1 wherein ascertaining the transmit power of the reference signal comprises performing reverse link power control on the reference signal.

6. The method of claim 1 wherein ascertaining the transmit power of the reference signal further comprises interpolating between periodic transmit power reports from the mobile station using power control commands.

7. The method of claim 1 wherein ascertaining the transmit power of the reference signal comprises receiving mobile station power headroom information from the mobile station.

8. The method of claim 1 wherein the minimum reference signal transmit power is established by tracking and estimating a long term minimum reference signal transmit power during operation.

9. The method of claim 1 wherein estimating the reverse link load based on the transmit power of the reference signal comprises estimating the reverse link load as the reference signal transmit power minus the minimum reference signal transmit power.

10. A base station of a wireless communication network, comprising:
    a receiver operative to receive reverse link wireless communications signals from mobile stations and further operative to receive a reference signal having a quality indication wirelessly transmitted from a test mobile station;
    a processor operative to control the receiver and to ascertain the transmit power of the reference signal by receiving periodic transmit power level reports from the mobile station and further operative to remove other base stations from an active set of the mobile station; and
    a reverse link load estimator operative to estimate the reverse link load based on the transmit power of the reference signal, said reverse link load estimator configured to:
       determine a minimum reference signal transmit power as the transmit power of the reference signal in the substantial absence of interference by calibrating the reference signal with a predetermined test function having a set noise floor; and
       estimate the reverse link load based on the a difference between the transmit power of the reference signal and the minimum reference signal transmit power.

11. The base station of claim 10 wherein the reverse link load estimator comprises a software module executing on the processor.

12. The base station of claim 10 wherein the reference signal comprises a voice call over the R-FCH.

13. The base station of claim 12 wherein the voice call is transmitted at the lowest frame rate.

14. The base station of claim 10 wherein the reference signal comprises R-REQCH signal that includes mobile station power headroom information.

15. The base station of claim 10 further comprising a reference signal generator operative to generate the reference signal and inject the reference signal into the receiver without transmitting the reference signal over an air interface.

16. The base station of claim 10 wherein the processor further ascertains the transmit power of the reference signal by interpolating between periodic transmit power level reports by sending power control commands to the mobile station.

17. The base station of claim 10 wherein the processor ascertains the transmit power of the reference signal by receiving mobile station power headroom information.

18. The base station of claim 10 wherein the reverse link load estimator tracks and estimates a long term minimum reference signal transmit power during operation.

19. The base station of claim 10 wherein the reverse link load estimator estimates the reverse link load as the reference signal transmit power minus the minimum reference signal transmit power.

* * * * *